(12) United States Patent
Ok et al.

(10) Patent No.: US 7,377,041 B2
(45) Date of Patent: May 27, 2008

(54) TORSION BEAM TYPE SUSPENSION, METHOD FOR FORMING TORSION BEAM, AND APPARATUS FOR FORMING TORSION BEAM

(75) Inventors: Choong-Suk Ok, Busan Metropolitan (KR); Sung-Wook Han, Busan Metropolitan (KR); Soon-Hyun Park, Ulsan Metropolitan (KR); Jong-Rae Lee, Ulsan Metropolitan (KR); Keun-Jae Park, Busan Metropolitan (KR)

(73) Assignee: Donghee Industrial Co., Ltd., Ulsan Metropolitan (KR)

( * ) Notice: Subject to any disclaimer, the term of this patent is extended or adjusted under 35 U.S.C. 154(b) by 337 days.

(21) Appl. No.: 10/945,088

(22) Filed: Sep. 20, 2004

(65) Prior Publication Data
US 2005/0035567 A1 Feb. 17, 2005

Related U.S. Application Data

(63) Continuation-in-part of application No. 10/748,607, filed on Dec. 30, 2003, now abandoned.

(30) Foreign Application Priority Data
Jun. 18, 2003 (KR) .................. 10-2003-0039464

(51) Int. Cl.
*B21D 53/88* (2006.01)
(52) U.S. Cl. ..................................... 29/897.2; 29/421.1
(58) Field of Classification Search ............... 29/897.2, 29/421.1
See application file for complete search history.

(56) References Cited

U.S. PATENT DOCUMENTS 6,065,502 A * 5/2000 Horton ...................... 138/177
2001/0022099 A1* 9/2001 Ueno et al. .................... 72/57

* cited by examiner

*Primary Examiner*—David P. Bryant
*Assistant Examiner*—Christopher M Koehler
(74) *Attorney, Agent, or Firm*—Wolf, Greenfield & Sacks, P.C.

(57) ABSTRACT

A torsion beam type suspension and a forming method of a torsion beam are disclosed. In the torsion beam type suspension comprising a pair of left and right trailing arms connected to each other through a torsion beam, front ends of the trailing arms being used to mount a vehicle body by using joints, the torsion beam is obtained by forming an overall length of a pipe having a certain wall thickness by using a pressure forming process. In this case, end sections defined at both end portions of the torsion beam have a cross-sectional shape of a hollow oval, a center section defined at a center portion of the torsion beam has a cross-sectional shape of a hollow open loop, and middle sections defined between the center portion and both the end portions of the torsion beam have a cross-sectional shape of a hollow open loop. The loop of the middle sections defines an inner space larger than that defined by the loop of the center section. Further, since the torsion beam can be easily formed by adopting a hydro-forming process, it is possible to achieve high twisting rigidity, bending rigidity, and durability without requiring a torsion bar and reinforcement, which must be inevitably assembled to a conventional torsion beam axle, resulting in a reduction of the number of constitutive elements and the overall weight.

1 Claim, 5 Drawing Sheets

US 7,377,041 B2

TORSION BEAM TYPE SUSPENSION, METHOD FOR FORMING TORSION BEAM, AND APPARATUS FOR FORMING TORSION BEAM

CROSS REFERENCE TO RELATED APPLICATION

This application is a continuation in part of U.S. application Ser. No. 10/748,607, filed Dec. 30, 2003 now abandoned.

FIELD OF THE INVENTION

The present invention relates to a torsion beam type suspension, a method for forming a torsion beam, and an apparatus for forming a torsion beam.

BACKGROUND OF THE INVENTION

Suspensions for motor vehicles are devices used to connect a vehicle body and wheels to each other, and are adapted to absorb shock and vibration applied from the road during movement, thereby improving ride comfort and stability of motor vehicles. Such suspensions are basically classified into integral type suspensions wherein left and right wheels are connected by an axle, and independent type suspensions wherein left and right wheels operate individually.

The suspensions comprise springs for absorbing shock from the road, shock absorbers adapted to restrict free vibration of the springs, arms or links for controlling the operation of wheels, and the like.

There is another type of suspension—torsion beam type suspension—configured in a fashion such that a pair of left and right trailing arms are coupled to each other by using a single member called a torsion beam or cross beam. Such configuration of the torsion beam type suspension is characterized in that the length of its link is longer, and the number of rubber bushes functioning as oscillating shafts is smaller, compared with strut type or double wishbone type suspensions. The torsion beam type suspension has several advantages in that it shows low friction hysteresis in relation to a suspension stroke, induces a high level of smooth ride comfort, and achieves a relatively high driving stability relative to its low production cost and mass, in spite of the fact that its design performance range is not high due to the simplification of constitutive components thereof. Thus, the torsion beam type suspension has been used in small and sub-medium sized motor vehicles during the last several decades.

Referring to FIG. 1, which illustrates a conventional torsion beam type suspension, a pair of left and right trailing arms 2 and 2' are connected by a torsion beam 4, the front ends of the trailing arms 2 and 2' serving to pivotally support a vehicle body (not shown) by joints 6 and 6' having rubber bushes, respectively, and the rear ends of the trailing arms 2 and 2' are coupled with wheels 8 and 8'. Suspension springs 10 and 10' are respectively installed between the trailing arms 2 and 2' and the vehicle body, and shock absorbers 12 and 12' are respectively connected to the rear ends of the trailing arms 2 and 2'. The conventional torsion beam type suspension constructed as stated above has features that enable the wheels 8 and 8' to be deformed due to the torsional deformation property of the torsion beam 4, and results in a toe-in state in case of bumps by virtue of such torsional deformation, position of the trailing arms, and a specific bushing property. The toe-in state means a state wherein, when looking down at the wheels, the distance between the front portion of the wheels aligned on the same axle is shorter than the distance between the rear portion of the wheels.

In the torsion beam type suspension as stated above, the trailing arms and torsion beam are welded together, thereby defining a so-called torsion beam axle. When a pair of left and right wheels move in opposite directions, the torsion beam axle is partially or wholly twisted. Such torsional twisting considerably affects the suspension, and is an important factor for controlling the performance of a motor vehicle. In this regard, the torsion beam should have a high torsional twisting rigidity against the rolling of a motor vehicle and a high bending rigidity against a lateral force inputted through tires when the motor vehicle makes a turn.

The conventional torsion beam, however, is manufactured by forming a thick iron plate having a thickness of about 4 mm to 5 mm to have a cross-sectional shape of a letter U by making use of a press, as shown in FIG. 1. Since the conventional torsion beam has insufficient twisting rigidity, bending rigidity and durability thereof, a separate torsion bar for satisfying a required twisting rigidity or bending rigidity, and a reinforcement for satisfying a required durability should be welded to the torsion beam.

The conventional torsion beam configured as stated above inevitably complicates the overall assembly process due to an increase in the number of constitutive components, and consequently increases the overall weight of a product.

SUMMARY OF THE INVENTION

The present invention has been made in view of the above drawbacks, and it is an object of the present invention to provide a torsion beam type suspension, which is capable of achieving high twisting rigidity, bending rigidity and durability, without coupling additional components, such as a torsion bar and reinforcement.

It is another object of the present invention to provide a method of easily forming a torsion beam for use in a torsion beam type suspension.

It is another object of the present invention to provide an apparatus for easily forming a torsion beam for use in a torsion beam type suspension.

In accordance with one aspect of the present invention, the above and other objects can be accomplished by the provision of a torsion beam type suspension comprising a pair of left and right trailing arms connected to each other through a torsion beam, front ends of the trailing arms being used to mount a vehicle body by using joints, wherein the torsion beam is obtained by forming an overall length of a pipe having a certain wall thickness by using a pressure forming process, wherein the end sections defined at both end portions of the torsion beam have a cross-sectional shape of a hollow oval, a center section defined at a center portion of the torsion beam has a cross sectional shape of a letter U, and middle sections defined between the center portion and both the end portions of the torsion beam have a cross-sectional shape of a hollow open loop, the loop of the middle sections defining an inner space larger than that of the loop of the center section.

In accordance with another aspect of the present invention, there is provided a method for forming a torsion beam having a cross-sectional shape of a letter U, comprising the steps of placing a pipe having a circular cross-sectional shape and a certain wall thickness on a lower mold; operating an upper mold, an upper punch, and side molds, thereby forming the circular pipe to have a cross-sectional shape of an oval; sealing the pipe by attaching plugs to both ends of the pipe, and injecting fluid through center hole(s) formed at least one of the plugs so as to fill an inner space of the pipe with the fluid, thereby applying internal pressure to an inner peripheral surface of the pipe; and pressing down the upper punch and pressing up a lower punch to form a U-shaped pipe, wherein the upper punch has a U-shaped convex corresponding to the concave surface of the U-shaped pipe, the lower mold has a concave portion corresponding to central regions of convex external surface of the U-shaped pipe, and the lower punch has side surfaces rounded to combine with the concave portion of the lower mold to form the external surfaces of the U-shaped pipe.

In accordance with another aspect of the present invention, there is provided an apparatus forming a circular pipe into a pipe having a cross-sectional shape of a letter U, the apparatus comprising an upper mold having a slot around the center of the mold; an upper punch movably inserted into the slot of the upper mold, and having a U-shaped convex portion to form the concave internal surface of the U-shaped pipe; a lower mold having a concave surface to form a convex central portion of the U-shaped pipe; a lower punch having rounded surfaces to combine with the concave surface of the lower mold to form a complete external U shape of the pipe, the lower punch being moved up and down along the sides of the lower mold; and side molds being located at both external sides of the lower punch, and supporting the longest diameter of the pipe when the circular pipe is formed into an oval-shaped pipe; wherein the upper mold has partially oval-shaped recesses to form the circular pipe into an oval pipe, and grooves to couple with the top surfaces of the side molds.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
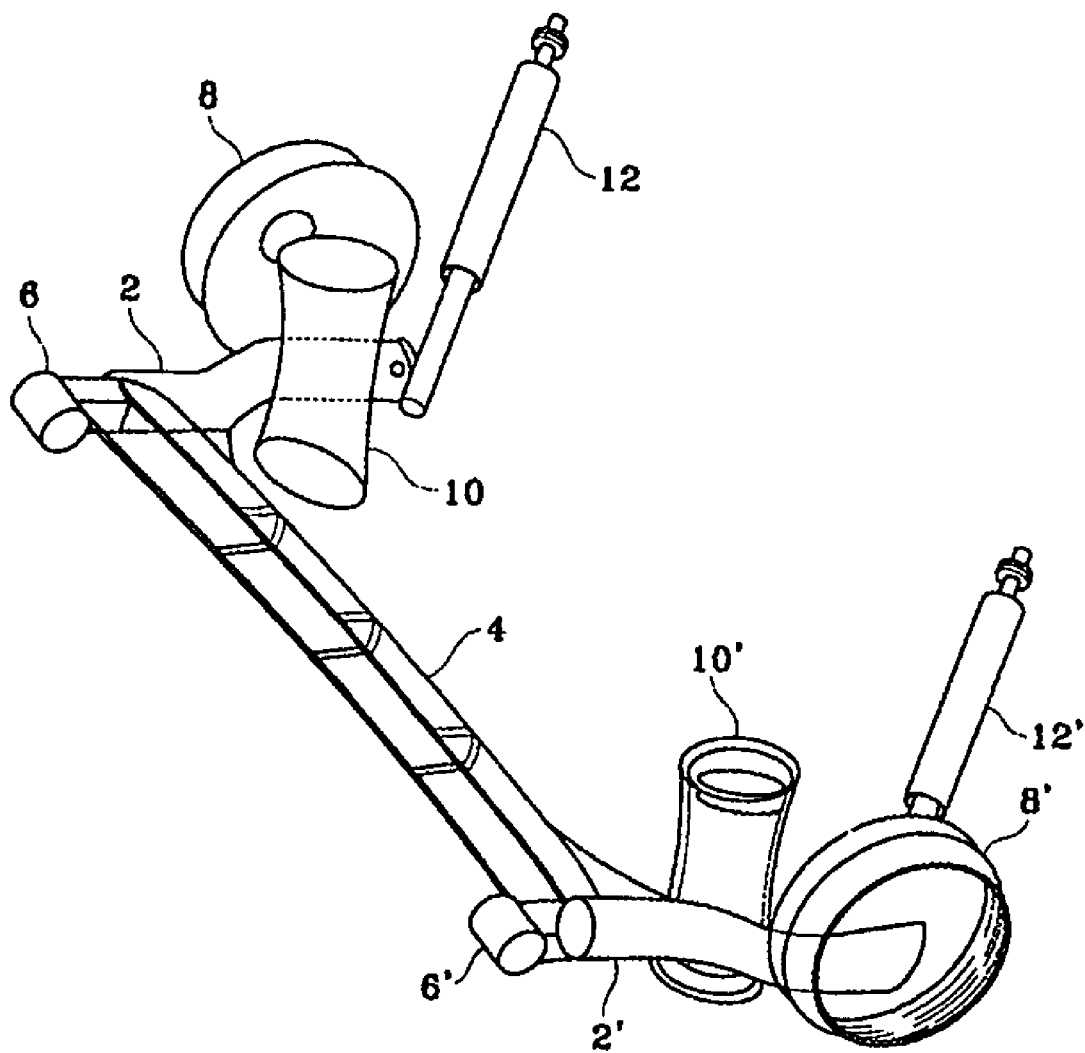
FIG. 1 is a perspective view illustrating a conventional torsion beam type suspension.
Figure 2:
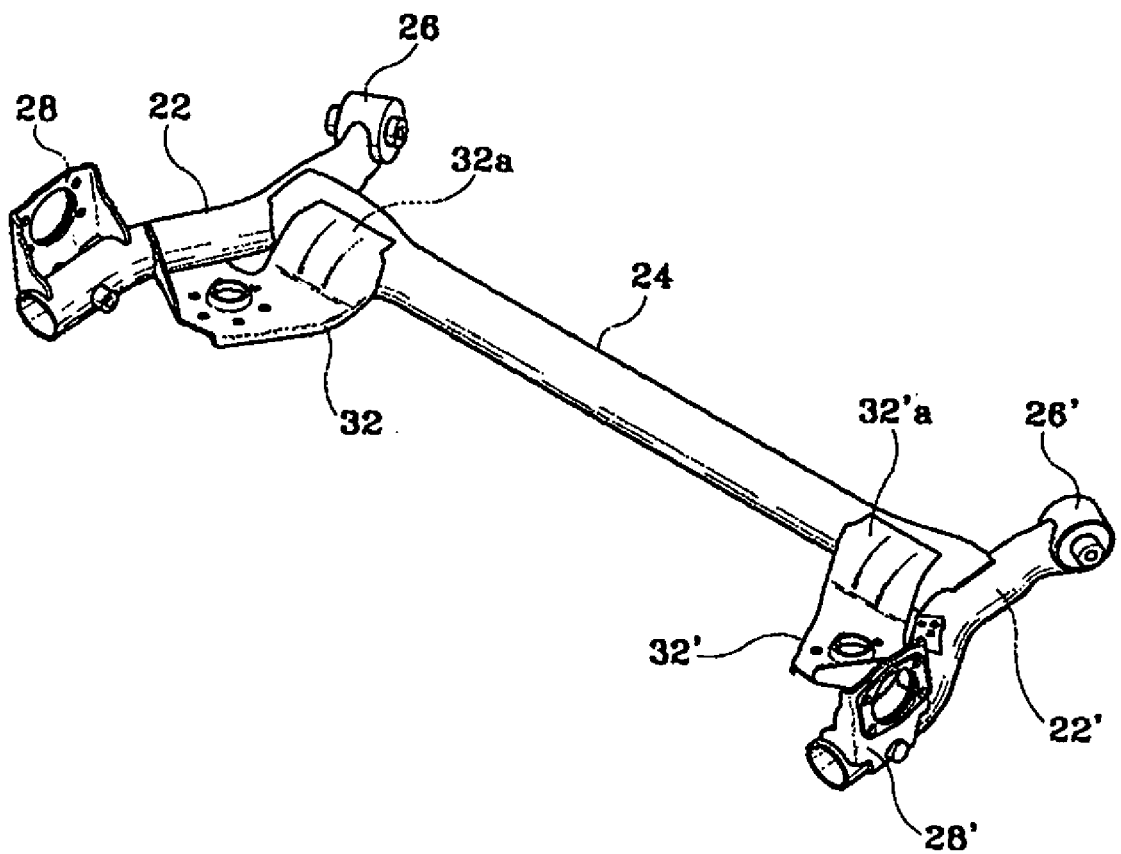
FIG. 2 is a perspective view illustrating a torsion beam axle of a torsion beam type suspension in accordance with the present invention.

As shown in FIG. 2, a torsion beam type suspension of the present invention is configured in a fashion such that a pair of left and right trailing arms 22 and 22' thereof are connected to each other through a torsion beam 24. The front ends of the trailing arms 22 and 22' are adapted to pivotally support a vehicle body (not shown) by using joints 26 and 26' having rubber bushes, respectively. Spindle brackets 28 and 28' are welded to the rear ends of the trailing arms 22 and 22' for allowing wheels to be coupled to the rear ends of the tailing arms 22 and 22', respectively. Further, spring seats 32 and 32' are welded on the trailing arms 22 and 22' at portions between the joints 26 and 26' and spindle brackets 28 and 28' for mounting the suspension springs. The configuration of the wheels, suspension springs, shock absorbers, and the like are the same as those shown in FIG. 1.

The trailing arms 22 and 22' are formed in the shape of a bent pipe.

Figure 3:
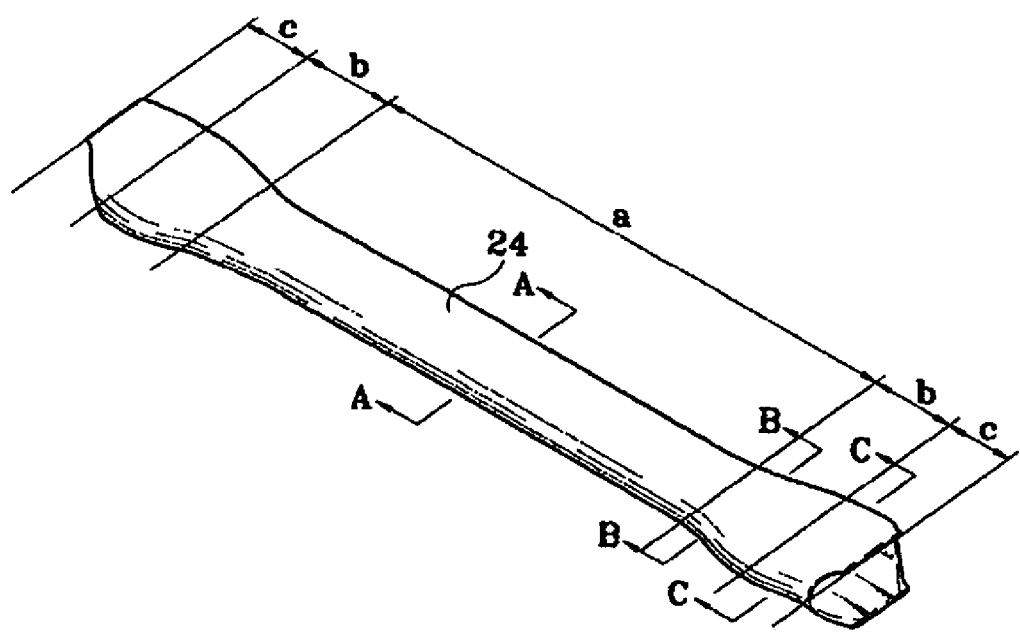
FIG. 3 is a perspective view illustrating a torsion beam shown in FIG. 2.
Figure 4:
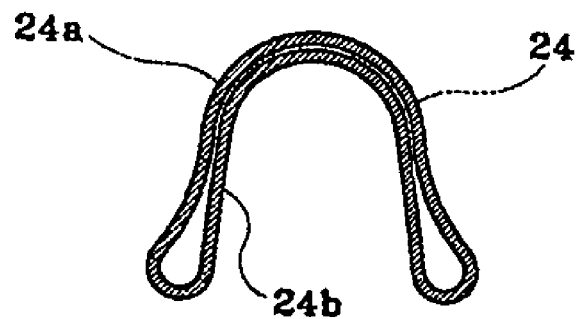
FIG. 4 is a cross-sectional view taken along arrow A-A in FIG. 3.
Figure 5:
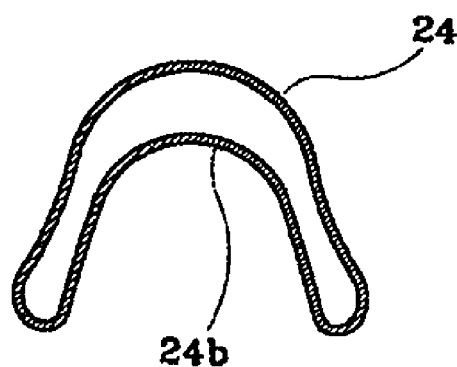
FIG. 5 is a cross-sectional view taken along arrow B-B in FIG. 3.
Figure 6:
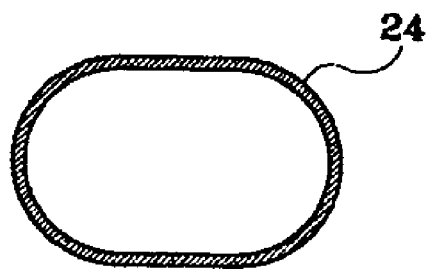
FIG. 6 is a cross-sectional view taken along arrow C-C in FIG. 3.

The torsion beam 24 is manufactured by forming the overall length of a pipe having a certain uniform wall thickness by using a pressure forming process. As shown in FIG. 3, the torsion beam 24 is a tubular torsion beam, and can be divided into sections a, b and c. Referring to FIG. 4, which illustrates a cross-sectional shape of section a positioned at the center portion of the torsion beam 24, the center portion of the torsion beam 24 has a cross-sectional shape of a letter U. Referring to FIG. 6, which illustrates a cross-sectional shape of sections c positioned at both end portions of the torsion beam 24, these end portions have a cross-sectional shape of a hollow oval. Referring to FIG. 5, which illustrates a cross-sectional shape of middle sections b positioned between section a and sections c, these middle sections b have a cross-sectional shape of a hollow open loop. The loop of middle sections b defines an inner space larger than that of section a.

Considering the cross-sectional shape of the open loop shown in FIGS. 4 and 5, the torsion beam 24 has an outer-side portion 24a and an inner-side portion 24b having a certain thickness. The torsion beam may be formed to have various cross-sectional shapes including an inverted letter V, an inverted letter U, and the like. Such cross-sectional shapes provide the torsion beam with large geometrical moment of inertia and polar moment of inertia, thereby allowing the torsion beam to have a high bending rigidity and twisting rigidity. The torsion beam 24 is processed to have a recessed shape at its end portions so that the end portions come into close contact with and are welded to the outer peripheral surfaces of the trailing arms 22 and 22'.

The spring seats 32 and 32' are welded at one of their end portions 32a and 32'a to the outer peripheral surface of the torsion beam 24 over sections b and c (shown in FIG. 3), and at the other end portions to certain portions of the trailing arms 22 and 22' near the spindle brackets 28 and 28'.

The tubular torsion beam 24 is made of a material having a high fatigue endurance as well as strength capable of independently supporting load. This load, conventionally, is supported by a torsion beam, to which a reinforcement and torsion bar are additionally coupled. Therefore, the tubular torsion beam 24 has a high yield strength and tensile strength and, thus, it is difficult for the tubular torsion beam to apply a general forming process. According to the present invention, the tubular torsion beam 24 is manufactured by using a process as shown in FIGS. 7a to 7c.

The first process is to place a pipe P on the top of central lower mold 48 whose top has a concave shape corresponding to the low portion of the letter U. Then, the pipe P is fixed by an upper punch 44. The upper punch 44 has a convex shape corresponding to the letter U and projecting part 45. The upper punch 44 is inserted into a slot formed around the center of the upper mold 40.

As shown on FIG. 7(e), plugs 56 and 56' are inserted into both ends of the pipe P, and working fluid is injected through center holes 57 formed at the plugs 56 and 56' so as to fill the inner space of the pipe, thereby applying internal pressure to the inner peripheral surface of the pipe P This process can be applied after completion of forming the pipe P into an oval shape as shown in FIG. 7(b).

The working fluid is non-compressible fluid such as water and oil. The internal pressure of the fluid can depend on the material and the thickness of the pipe P, but preferably ranges from 4M Pa to 12M Pa. It is important to maintain the internal pressure into a certain value of pressure during the forming process of the pipe P into a U shape in which the internal space of the pipe P becomes smaller and smaller. For this purpose, a servo valve (not shown) is used to keep the internal pressure constantly in fluid supply lines. By applying internal pressure, the pipe P can be formed without defects.

The side molds 52 and 52' are moved inside to contact the side surfaces of the lower punch 46. Then, the upper molds 40 and the upper punch 44 are pressed down to form the circular pipe P into an oval tubular pipe at the overall length. Section c in FIG. 3 is completed by this process. The height (or smaller diameter) of the oval shape formed is preferably 0.5 to 0.7 times of the diameter of the original circle. As showed in FIG. 7(a), the upper mold 40 has inner recesses 47 to form the circular pipe P into an oval shape. As shown in FIG. 7(b) the oval shape is defined by the recesses 47 of the upper mold 40, the bottom line of the upper punch 44, the inside surfaces of the side molds 52 and 52', and the upper surfaces of the lower mold 46 and the central lower punch 48. As shown in FIG. 7(b), the top surfaces of the side molds 52 and 52' couple with grooves 49 of the upper molds 40 and, therefore, the distance between the left and right side molds 52 and 52' is maintained during the forming processes. This oval forming process is a previous step for forming the U shaped pipe. Such previous step of forming the oval shape makes it easier to form the final U shaped pipe without damages.

As said above, attaching the plugs 56 and 56' to both ends of the pipe P and injecting fluid into the pipe P can be done after finishing the oval forming process. Next, the central lower mold 48, the side molds 52 and 52', and the upper mold 40 are maintained in a fixed state. Axial pressures are applied from each of the ends of the pipe P toward the center of the pipe P. Then, the upper punch 44 is pressed down and the lower punch 46 is pressed up to form a complete U-shaped pipe. The side surfaces of the lower punch 46 consist of a partial U shape, and combine with the top surface of the lower mold 48 to form a complete U shape.

A complete U-shaped pipe without damages can be obtained by applying axial pressures from each of the ends of the pipe P toward the center of the pipe P Especially, the transition areas between sections a, b, and c are formed smoothly without defects and damages by the internal pressure of fluid and by the axial pressures. In an embodiment where a circular pipe having a diameter of 90 mm and a length of 1,100 mm is initially used, the length of the complete U-shaped pipe after the forming processes is 1,088 mm, that is, shorter by 12 mm than the initial length of the pipe P. During the forming processes, both ends of the pipe P should be fixed without movement except for the axial shrinkage by the axial pressures. The upper punch 44 and the lower punch 46 may be long-bar shapes so as to cover sections a, b, and c shown in FIG. 3.

Figure 7:
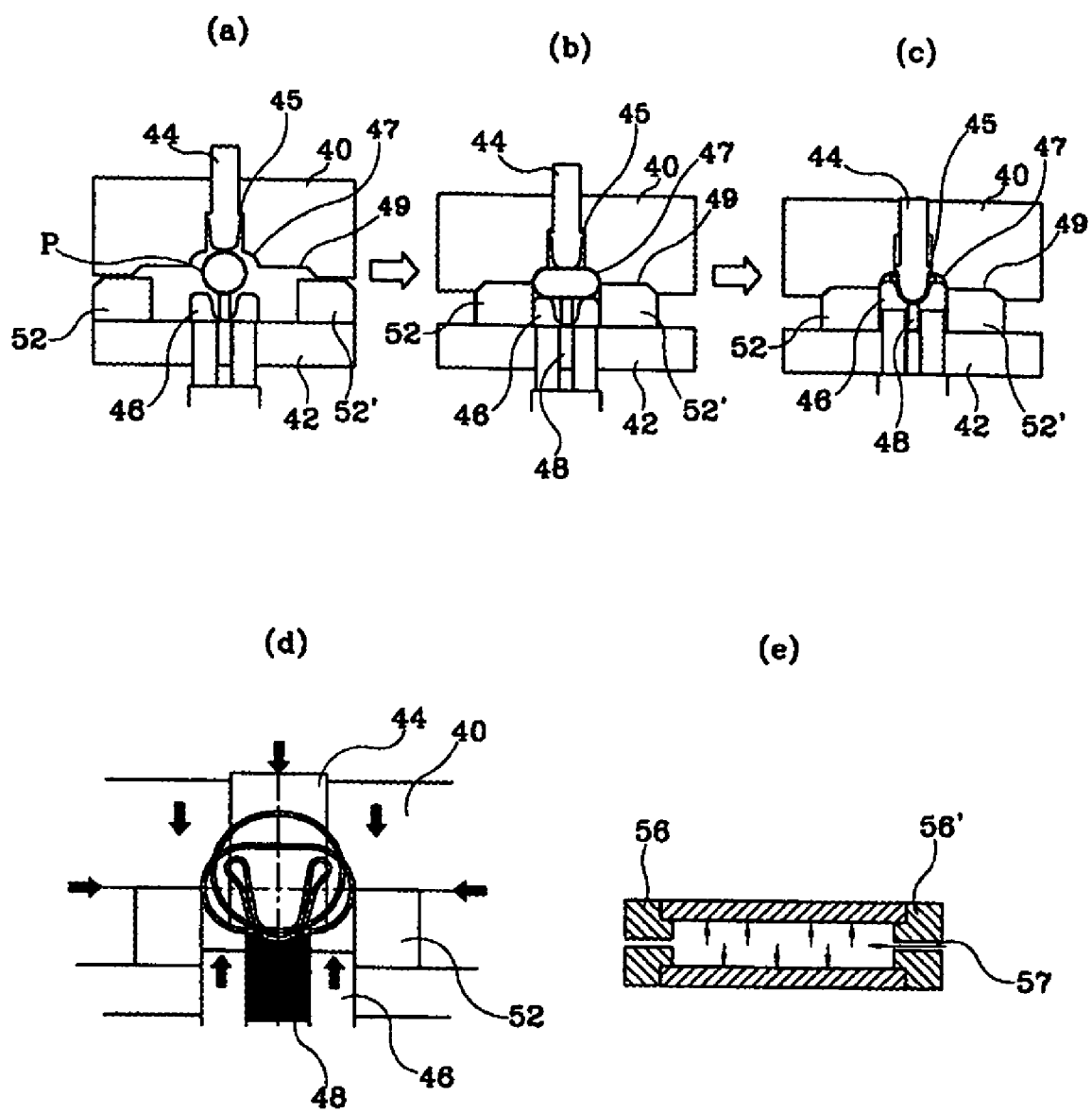
FIGS. 7a to 7e are sectional views illustrating the sequential steps of forming the torsion beam provided in the torsion beam type suspension in accordance with the present invention.

FIG. 7(d) shows enlarged consecutive processes of FIG. 7(a), (b), and (c). The arrows mean directions of pressures applied to each of molds and punches and the pipe P. Upon completion of the process (c) in FIG. 7, the upper punch 44 is moved up and the lower punch 46 is moved down. In this case, the recesses 47 of the upper mold 40 and the central lower mold 48 function as removers which separate the U-shaped pipe from the upper and lower punches 44 and 46.

Figure 8A:
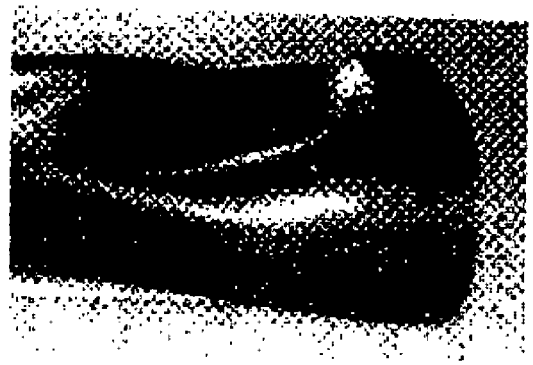
FIG. 8a is a picture showing the shape of an end portion of the torsion beam when the torsion beam is formed in a state wherein a pipe is subjected to no internal pressure.
Figure 8B:
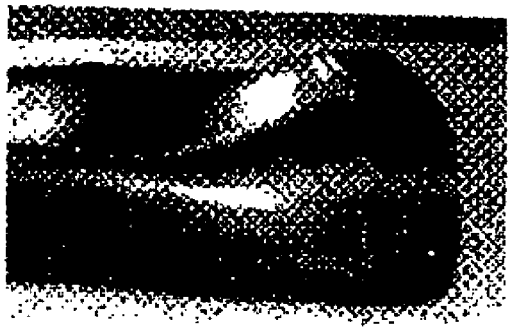
FIG. 8b is a picture showing the shape of an end portion of the torsion beam when the torsion beam is formed in a state wherein a pipe is subjected to internal pressure of 5 Mpa.
Figure 8C:
FIG. 8c is a picture showing the shape of an end portion of the torsion beam when the torsion beam is formed in a state wherein a pipe is subjected to internal pressure of 10 Mpa.

FIG. 8a is a picture showing the shape of an end portion of the torsion beam when the torsion beam is formed in a state wherein a pipe is subjected to no internal pressure. FIG. 8b is a picture showing the shape of an end portion of the torsion beam when the torsion beam is formed in a state wherein a pipe is subjected to internal pressure of 5M Pa. FIG. 8c is a picture showing the shape of an end portion of the torsion beam when the torsion beam is formed in a state wherein a pipe is subjected to internal pressure of 10 M Pa.

As can be seen from the picture of FIG. 8, when internal pressure is lacking in the pipe, the end portions of the formed torsion beam are steeply depressed. Further, it can be understood that, as shown in FIGS. 8b and 8c, when the torsion beam is formed in a state wherein a certain internal pressure is applied to the pipe, the end portions of the torsion beam are formed into smoothly curved concave surfaces. The internal pressure of the pipe is preferably in the range of 4M Pa to 12M Pa during forming. Although the internal pressure can exceed 12M Pa, it is not preferable in view of costs since such a high internal pressure requires a large-scale press.

As apparent from the above description, the present invention provides a torsion beam type suspension and a forming method for a torsion beam. According to the present invention, since the torsion beam can be formed as a tubular torsion beam having a cross-sectional shape of a letter U or hollow closed oval, the torsion beam can attain a large geometrical moment of inertia and polar moment of inertia, resulting in high bending rigidity and twisting rigidity. Therefore, without requiring a torsion bar and reinforcement, which must be fixed to a conventional torsion beam axle, it is possible to provide the torsion beam type suspension with high twisting rigidity, bending rigidity, and durability. This results in a reduction of the number of constitutive elements and the overall weight.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for forming a torsion beam having a cross-sectional shape of a letter U, comprising the sequential steps of:

placing a pipe having a circular cross-sectional shape and a certain wall thickness on a lower mold;

operating an upper mold, an upper punch, and side molds, thereby forming the entire length of the circular pipe to have a cross-sectional shape of an oval, wherein the formation of both end portions of the torsion beam is completed without deformation hereinafter;

sealing the pipe by attaching plugs to both ends of the pipe, and injecting fluid through center hole(s) formed in at least one of the plugs so as to fill an inner space of the pipe with the fluid, thereby applying internal pressure to an inner peripheral surface of the pipe;

pressing down the upper punch and pressing up a lower punch to form a U-shaped pipe, wherein the upper punch has a U-shaped convex portion corresponding to the concave surface of the U-shaped pipe, the lower mold has a concave portion corresponding to central regions of the convex external surface of the U-shaped pipe, and the lower punch has side surfaces rounded to combine with the concave portion of the lower mold to form the external surfaces of the U-shaped pipe; and applying axial pressures from both ends of the pipe toward the center of the pipe after sealing the pipe, wherein the applied internal pressure of the pipe is in the range of 4 Mpa to 12 Mpa, wherein the internal pressure is constantly maintained by a servo valve during the forming process, and wherein the smallest diameter of the oval-shaped pipe is 0.5 to 0.7 times of the diameter of the initial circular pipe.

* * * * *